No. 790,767.

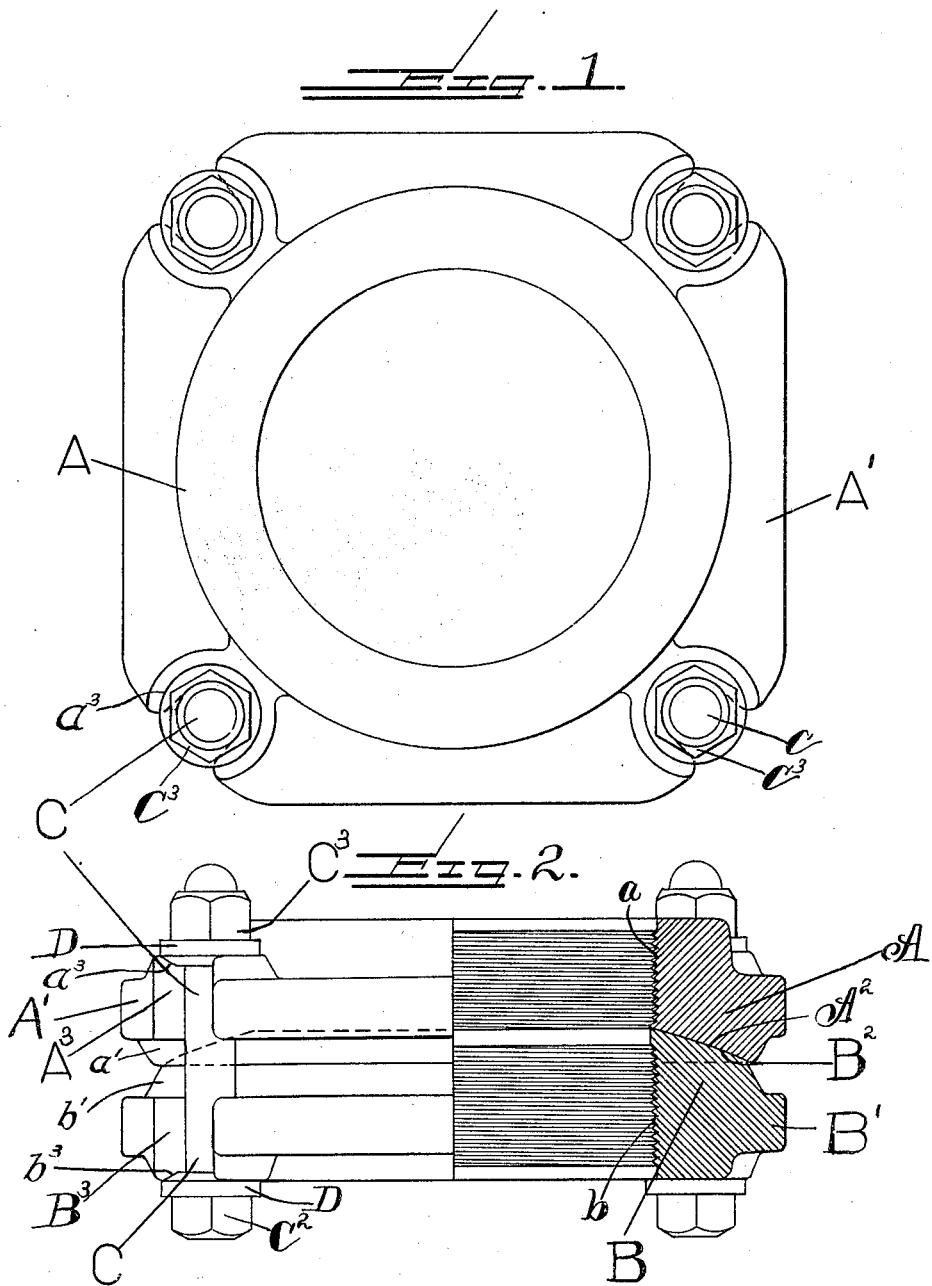

Patented May 23, 1905.

UNITED STATES PATENT OFFICE.

JOHN D. WALSH, OF LOCKPORT, NEW YORK, ASSIGNOR TO AMERICAN DISTRICT STEAM COMPANY, OF LOCKPORT, NEW YORK, A CORPORATION OF NEW YORK.

BALL-JOINT.

SPECIFICATION forming part of Letters Patent No. 790,767, dated May 23, 1905.

Application filed March 23, 1903. Serial No. 149,092.

*To all whom it may concern:*

Be it known that I, JOHN D. WALSH, a citizen of the United States, residing at Lockport, in the county of Niagara and State of New York, have invented certain new and useful Improvements in Ball-Joints; and I do hereby declare the following to be a full, clear, and exact description of the invention, such as will enable others skilled in the art to which it appertains to make and use the same.

The object of this invention is to provide an improved coupling of the ball-and-socket variety for the adjoining ends of pipes; and the invention may be said to consist in the constructions illustrated and described and in the combinations specified in the claim.

In the drawings, Figure 1 is a plan view of my improved pipe-coupling, and Fig. 2 is a side elevation half in vertical section.

Referring now to the drawings, the letters A B indicate two tubular members constituting a ball-joint and constructed to have a universal movement upon each other for effecting a large range of angular adjustment. A is the female member, having its engaging end $A^2$ spherically concaved transverse to its axis, and B is the male member, with its adjoining end $B^2$ spherically convexed in the same manner. The members are internally threaded, as at $a$ $b$, to permit attachment to sections of pipe. The tubular members are provided with laterally-extending flanges $A'$ $B'$, which are so positioned that when the members are in alinement the flanges will be spaced from each other in order not to interfere with angular adjustment. Further, the portions $a'$ $b'$ of the members immediately in rear of the portions of the spherical regions that are in engagement when the members are in alinement extend rearward to the flanges in such manner that the movement of the spherical regions upon each other is not obstructed. It is necessary of course that the portion $b'$ of the male member lies within the curvature of the spherical regions, else the movement of the members would be blocked at the outset.

To provide for connecting the flanges for securing the members at the various angles, the flanges are furnished with slotted openings $A^3 B^3$, extending inward from the peripheries of the flanges, and inclosing these openings on the remote faces of the flanges are circular concavely-curved depressions $a^3 b^3$. The slotted openings in the flanges are to be connected by securing devices having shanks of such size as to permit their insertion laterally into the openings and enlarged heads provided with convex inner faces to engage with the depressions $a^3 b^3$. As illustrated, these devices comprise bolts C, nuts $C^3$, and washers D, interposed between the heads $C^2$ of the bolts and the nuts $C^3$ and the flanges, and provided with the convexed inner surfaces. The shanks of bolt C are sufficiently reduced with reference to slotted openings $A^3$ $B^3$ to permit of their removal laterally from the openings and to allow of the angular adjustment of the pipe members.

In use the adjoining ends of two pipe-sections are screwed into the tubular members, and the angular adjustment is obtained by screwing and unscrewing the nuts until the tubular members have been forced to assume the proper angle, when all the nuts are tightened and the union will be securely held. By reason of the slotting of the bolt-holes the bolts may be inserted or removed laterally without unscrewing the nuts all the way or slipping the washers from the bolts. The ball-and-socket connection between each end of each bolt and the engaging flange serves two functions—first, the reduction of strain upon the connecting devices, and, second, prevention of the bolts from slipping out of the apertures when the tubular members are adjusted at an angle, as might well be the case with plane engaging surfaces.

What is claimed as new is—

In a pipe-coupling, two tubular members constituting a ball-joint permitting universal movement of the members upon each other, one end of the male member being spherically convexed and the engaging end of the female member being spherically concaved, the portion of the male member immediately in rear of the portion of the spherical region thereof engaged by the spherical region of the female member when the members are in alinement being directed rearward within the curvature of the spherical regions; combined with laterally-projecting flanges, one on each tubular member, positioned to be spaced from each other when the members are in alinement, and provided with slotted openings extending inward from the peripheries of the flanges and with circular concavely-curved depressions inclosing said openings on the remote faces of the flanges, and combined also with bolt-and-nut securing devices passing through registering pairs of openings in the two flanges and having shanks sufficiently reduced with reference to said openings to permit of their removal laterally therefrom and to allow of the angular adjustment of the tubular members, said devices being provided also with enlarged heads having convexly-curved inner surfaces occupying the concave depressions in the flanges.

In testimony whereof I affix my signature in the presence of two subscribing witnesses.

JOHN D. WALSH.

Witnesses:
BURT W. HALL,
CHARLES R. BISHOP.